(12) United States Patent
Matthews

(10) Patent No.: US 9,672,097 B2
(45) Date of Patent: Jun. 6, 2017

(54) MACHINE ERROR AND FAILURE MITIGATION

(71) Applicant: AGCO Corporation, Hesston, KS (US)

(72) Inventor: Paul Ross Matthews, Bayern (DE)

(73) Assignee: AGCO Corporation, Duluth, GA (US)

( * ) Notice: Subject to any disclaimer, the term of this patent is extended or adjusted under 35 U.S.C. 154(b) by 114 days.

(21) Appl. No.: 14/626,021

(22) Filed: Feb. 19, 2015

(65) Prior Publication Data

US 2015/0254127 A1    Sep. 10, 2015

Related U.S. Application Data

(60) Provisional application No. 61/947,635, filed on Mar. 4, 2014, provisional application No. 62/042,970, filed on Aug. 28, 2014.

(51) Int. Cl.
| | |
|---|---|
| *G06F 11/00* | (2006.01) |
| *G06F 11/07* | (2006.01) |
| *G06F 11/30* | (2006.01) |
| *G06F 11/36* | (2006.01) |
| *G06F 11/32* | (2006.01) |
| *G06F 9/445* | (2006.01) |

(52) U.S. Cl.
CPC ............ *G06F 11/0793* (2013.01); *G06F 8/65* (2013.01); *G06F 11/0748* (2013.01); *G06F 11/3006* (2013.01); *G06F 11/327* (2013.01); *G06F 11/366* (2013.01)

(58) Field of Classification Search
CPC ............... G06F 11/0793; G06F 11/366; G06F 11/1433; G06F 11/3006; G06F 11/0742; G06F 8/65

See application file for complete search history.

(56) References Cited

U.S. PATENT DOCUMENTS

| | | | |
|---|---|---|---|
| 7,272,475 B2 | 9/2007 | Gawlik et al. | |
| 8,301,333 B2 | 10/2012 | Singh et al. | |
| 8,655,336 B1* | 2/2014 | Dempski ............. | H04L 41/5074 370/310.2 |
| 2005/0114852 A1* | 5/2005 | Chen .................. | G06F 11/1433 717/168 |
| 2006/0092033 A1 | 5/2006 | Hoff et al. | |
| 2008/0316009 A1 | 12/2008 | Nagata | |
| 2011/0221592 A1 | 9/2011 | Maziak et al. | |
| 2015/0040113 A1* | 2/2015 | Muench-Casanova ............................ | G06F 9/4406 717/168 |
| 2015/0207683 A1* | 7/2015 | Adogla ............... | H04L 41/0893 709/223 |

OTHER PUBLICATIONS

European Patent Office, International Search Report for related European Application No. EP15155408, mail date Jul. 16, 2015.

* cited by examiner

*Primary Examiner* — Charles Ehne

(57) ABSTRACT

In one embodiment, a method comprising receiving, at a machine, a first message; operably connecting the machine to a device that comprises a temporary update; loading the update from the device; and mitigating the first message with the update before receiving a more permanent solution to the first message.

9 Claims, 9 Drawing Sheets

MACHINE ERROR AND FAILURE MITIGATION

CROSS REFERENCE TO RELATED APPLICATIONS

This application claims the benefit of U.S. Provisional Application No. 61/947,635 filed Mar. 4, 2014, and 62/042,970, filed Aug. 28, 2014, both of which are hereby incorporated by reference in their entirety.

TECHNICAL FIELD

The present disclosure is generally related to machines, and, more particularly, to machine diagnostics.

BACKGROUND

Machines used in the agriculture, construction and forestry industries are becoming increasingly complex. Such machines often include, for example, communications and control systems that perform various automated operational functions and assist operators and technicians in detecting problems and failures associated with machine operation. Such systems may be enabled by complex operating software. Some systems provide information to technicians about machine component status, including component failure, degradation or atypical operation. Some systems include a graphical user interface operable to display messages related to machine component failure, degradation or abnormal operation.

As such machines increase in complexity, identifying and resolving issues related to component failure and abnormal machine operation also becomes increasingly complex. With large numbers of components that are interrelated in operation, for example, problems associated with one component may affect the operation of one or more other components. Similarly, resolving problems associated with one component may require considering operation of related components. In some instances, defective system software may falsely indicate a mechanical problem with the machine, or may incorrectly identify the source of a mechanical problem. Identifying the source of a problem and developing a workable solution to the problem may take weeks or months.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DESCRIPTION OF EXAMPLE EMBODIMENTS

Overview

Figure 1:
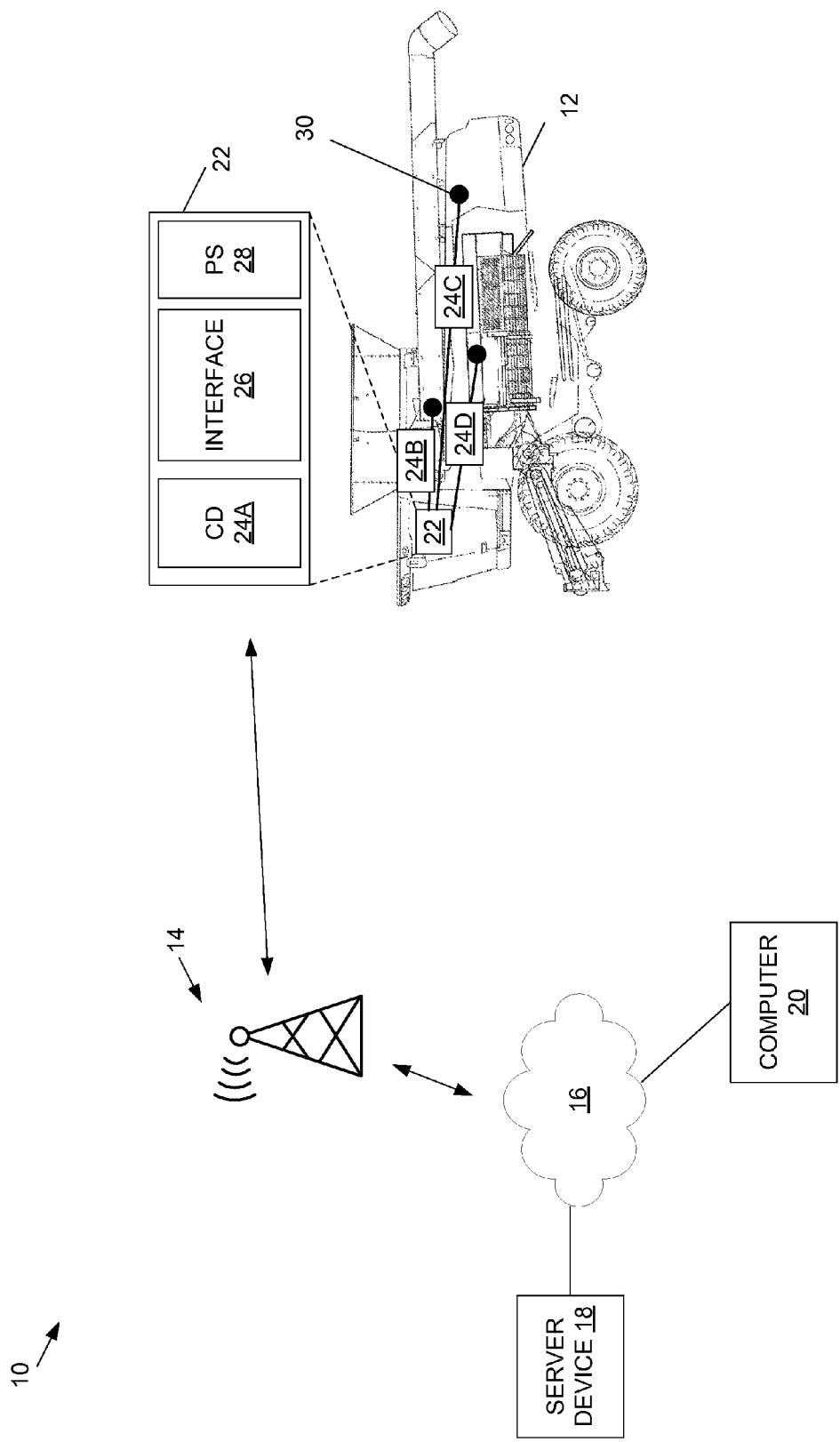
FIG. 1 is a schematic diagram that illustrates an example environment in which an embodiment of a machine diagnostic mitigation system may be implemented.

In one embodiment, a method comprising receiving, at a machine, a first message; operably connecting the machine to a device that comprises a temporary update; loading the update from the device; and mitigating the first message with the update before receiving a more permanent solution to the first message.

DETAILED DESCRIPTION

Certain embodiments of a machine diagnostic mitigation system and method are disclosed that dynamically address machine operational errors and failures, and further dynamically address error and failure notifications communicated to machine operators. In one embodiment, a machine diagnostic mitigation system comprises a machine control system that is equipped for network communications, such as communications via the Internet. For instance, an embodiment of the machine diagnostic mitigation system may receive, via a network communications channel, information or data used to address problems detected by the machine control system. The information or data may be used to generate information messages presented to machine operators or may be used to update machine software.

Digressing briefly, machine systems (e.g., agricultural machines, among machines for other industries) are becoming more and more complex and integrated, creating more reliance on software to manage the functions and operations of such systems. When errors or precursors to those errors occur, many systems include messages (e.g., error messages indicating an error, warnings and diagnostics messages preceding the error, etc.) to help isolate the nature of the failure, whether source of the failure be an electronic sensor or even faults in software (e.g., assuming self-diagnostic capabilities). With such complex systems, resolution of issues, especially when related to complex software, can be non-trivial. The burden is on the system provider to ensure correct root cause analysis. For instance, a sound solution with verification and ensuring the fix works well within the rest of the system can take long periods of time, leading to customers waiting at times many months before they see a resolution, which erodes the customer's confidence in the quality of the purchased products and the provider's care or interest in maintaining the product. This is especially true for systems such as mobile machines (e.g., vehicles), which once acquired by the customer, have limited contact for updates and corrections by a technician.

Many system providers are aware of the above shortcomings, and thus look to provide work around solutions in the meantime which may require a service technician visit, alternate use of a feature, or a customer tolerating annoying messages until the error or warning is resolved. That is, before a complete solution to an issue is available, mitigation of issues is traditionally a very manual process involving calls to support centers as each user or dealer discovers an issue that does not have a solution. In some cases where a mitigation is available, this manual process might be achieved via a series of telephone calls that ultimately instruct a user to just ignore an issue, but can still leave the user with a deflated opinion of the system provider and/or the system. In contrast, certain embodiments of a machine diagnostic mitigation system add improvements to work around solutions by dynamically enabling connected users to receive augmented work flows and/or better advice for a given error such that, in many cases, customers that may not have yet recognized an issue are receiving timely advice without the need to call a support technician for which they would have to pay, even though a more permanent solution is not available. For instance, when a mitigation is determined, an update (e.g., in the form of a mitigation message and/or work around) is provided to all connected users directly. The service technician may also be informed that a mitigation is available, and what the mitigation is, so that he or she may choose to manually update unconnected users and maintain a reputation of adding value to the customer (verifiable) while the issue still does not having a complete or more permanent solution.

Having summarized certain features of machine diagnostic mitigation systems of the present disclosure, reference will now be made in detail to the description of the disclosure as illustrated in the drawings. While the disclosure will be described in connection with these drawings, there is no intent to limit it to the embodiment or embodiments disclosed herein. For instance, in the description that follows, one focus is on an agricultural machine embodied as a combine harvester, though it should be appreciated that some embodiments of machine diagnostic mitigation systems may use other agricultural machines (e.g., planters, sprayers, foragers, windrowers, including support machines, such as truck and trailer combinations), towed or self-propelled, and/or machines (mobile or stationary) from other industries that can benefit from collaboration over a network with remote computing systems or devices to achieve the goals of mitigating message provided in (or in association with) a machine, and hence are contemplated to be within the scope of the disclosure. Further, although the description identifies or describes specifics of one or more embodiments, such specifics are not necessarily part of every embodiment, nor are all various stated advantages necessarily associated with a single embodiment or all embodiments. On the contrary, the intent is to cover all alternatives, modifications and equivalents included within the spirit and scope of the disclosure as defined by the appended claims. Further, it should be appreciated in the context of the present disclosure that the claims are not necessarily limited to the particular embodiments set forth in the description.

Referring now to FIG. 1, shown is a schematic diagram that illustrates an example environment in which an embodiment of a machine diagnostic mitigation system 10 may be implemented. It should be appreciated by one having ordinary skill in the art, in the context of the present disclosure, that the example environment is merely illustrative, and that in some embodiments, other configurations and/or machines may be used. In one embodiment, the machine diagnostic mitigation system 10 comprises one or more machines, such as machine 12, a wireless network (e.g., cellular network) 14, and a wide area network 16 (e.g., Internet) that is coupled to the wireless network 14. Coupled to the wide area network 16 are a server device 18 and a computer 20. In some embodiments, the machine diagnostic mitigation system 10 may comprise all of the aforementioned components or fewer components in some embodiments. The server device 18 may be located remotely from the worked fields, such as at a business (e.g., farm, an Internet Service Provider (ISP) facility, regional or local agricultural machine manufacturer's representative facility, manufacturer's facility, among others), or other locations remote from the field. The server device 18 may host a web-service, or serve as a gateway to one or more other server devices in the Internet, and be coupled to the machine 12 over wireless (and possibly wired) connections. The server device 18 may be utilized (with or without coupled storage devices) to receive, from a service provider such as a machine manufacturer, temporary updates (as explained below) for a plurality of machines. The updates are to be downloaded to the plural machines operably connected to the wide area network 16 (via the wireless network 14) to mitigate messages (hereinafter, contemplated to include error messages corresponding to an error, or warnings and/or diagnostics that are a precursor to the error and/or error message, wherein messages may be textual and/or graphical (e.g., icons)) until a more permanent solution is provided, as explained further below. The computer 20 may be a computing device that is used by a dealer and/or technician to communicate data with the manufacturer, such as to receive the updates. For instance, the computer 20 enables the dealer and/or technician to remain in the loop in any service issues, and enables the dealer and/or technician to receive any updates and, in turn, load the update onto a (portable) memory device (e.g., memory stick, etc.) for a personal delivery and subsequent manual insertion into a machine during a customer visit (e.g., where the machine is not connected to the server device 18). In some embodiments, the device used to transfer the updates may comprise a service or diagnostic tool that is portable and used proximally to the machine 12 to operably connect (e.g., via a wired or wireless connection) to the machine 12, enabling the transfer of the update to the machine 12. It should be appreciated that other computing devices (e.g., more server devices 18, more computers 20, storage devices, etc.) may be coupled to the wide area network 16. Further, it should be appreciated by one having ordinary skill in the art that other equipment used to facilitate wireless and/or cellular functionality, such as switches, routers, gateways, a mobile core, DSLAM, central office, and/or ISP facilities, etc., may be deployed in certain embodiments of a machine diagnostic mitigation system 10, though not shown to avoid obfuscating relevant features of the present disclosure. In other words, it should be appreciated within the context of the present disclosure that some embodiments of a machine diagnostic mitigation system 10 may include additional components, fewer components, or different components. For instance, communication may be achieved, at least in part, via the use of a satellite system in some embodiments, and hence communications are not limited to entirely terrestrial mechanisms.

In one embodiment, the machine 12 depicted in FIG. 1 is equipped with a central control system 22. The control system 22 comprises an electronic control unit (ECU) or equivalently, a computing device (CD) 24A, as well as an interface 26 (also referred to herein as an interface device or interface devices), and a positioning system 28. Note that in some embodiments, functionality of the interface 26 and/or positioning system 28 may reside in the computing device 24A. In some embodiments, the control system 22 is coupled (e.g., wirelessly, or via a wired connection such as via a data bus) to plural computing devices 24 (e.g., 24B, 24C, and 24D), each computing device 24 providing command and control for a respective machine subsystem. Note that the quantity of computing devices 24 depicted in FIG. 1 is merely illustrative, and that in some embodiments, fewer or greater quantities may be used. For instance, the computing device 24A may provide command and control for a guidance system associated with the positioning system 28. Computing device 24B may provide command and control for grain tube functionality. Computing device 24C may provide command and control for hydraulic operations of the machine 12. Computing device 24D may provide command and control for the processing/cleaning system of the machine 12. Fewer or additional computing devices 24 may be used to handle (e.g., provide command and control to) these and/or other machine subsystem operations. The computing devices 24 may be configured in peer-to-peer relationship, or as depicted in FIG. 1, configured in a master-slave configuration, where the computing device 24A serves in the role of connecting to the server device 18 and communicates updates to the various computing devices 24B-24D. However, in some embodiments, any one of the computing devices 24 may serve as a master controller (e.g., in a peer-to-peer configuration), including network connectivity functionality. In some embodiments, one or more of the computing devices 24 is coupled to one or more sensors 30 to detect problems in respective subsystem operations. For instance, the sensors 30 that communicate any component or system faults or failures over a respective wired and/or wireless connection to the respective computing device 24. In some embodiments, errors in software (e.g., application software in the respective computing device 24A-24D) may be detected by self-diagnostic software without requiring an associated sensor 30. In one embodiment, errors detected by the respective computing devices 24B-24D are communicated to the central computing device 24A of the control system 22, and updates are provided from the computing device 24A (e.g., as received from the server device 18, or in some embodiments, as uploaded from a memory device) to the respective computing devices 24B-24D.

The computing device 24A provides for the overall command and control of the control system 22. In one embodiment, the interface 26 comprises a transceiver and one or more antennas, such as a modem (e.g., cellular modem and/or radio modem) of well-known construction that enables wireless (e.g., cellular Internet) access to the server device 18. That is, the interface 26 enables machine-to-Internet (and Internet-to-machine) communications. In some embodiments, the interface 26 may be embodied as a data port (e.g., USB port) that couples to a modem, and in some embodiments, the interface 26 may be embodied as simply a data port (with no RF communications functionality). The positioning system 28 enables a determination of the current geographical location of the machine 12, and in some embodiments, may comprise guidance functionality. In one embodiment, the positioning system 28 comprises a global navigation satellite system (GNSS), such as one or more of a global positioning system (GPS), GLONASS, Galileo, among other constellations. In some embodiments, the positioning system 28 may be embodied as a mobile device (e.g., handheld) that is communicatively coupled to the computing device 24A.

As indicated above, the server device 18 may function as a central repository for updates that are uploaded by a manufacturer to mitigate (temporarily) certain messages (and the underlying hardware and/or software component fault or failure) until a more permanent solution can be implemented. Digressing briefly, many machine systems include error codes that are tied to specific behaviors of the one or more subsystems such as a sensor failure, or a warning of some monitored quantity being out of tolerance. For some types of faults, early in the root cause analysis process, it may be determined that the error itself is erroneous, or there is a straight forward work around that now simply needs to be communicated with the customers. For a connected user (for example, their machine has the ability to receive information from the server device 18 over the Internet 16 via the carrier network 14), the connected system (e.g., control system 22) may communicate with the server device 18 to determine if there are any updates for the particular system configuration (e.g., version) of the subsystem components (e.g., application software for a respective computing device 24) that are currently installed on the machine 12, which is experiencing an error or precursor to an error as manifested by the presentation of a message. The service organization (e.g., of a manufacturer) may then provide the update, which in one embodiment, may provide a message that provides better advice (e.g., supplements or replaces the current message) or, in general, mitigates the message until a more permanent solution to the message (and its underlying problem) is provided.

An update may be embodied in a plurality of different forms. For instance, in one embodiment, an update may comprise a message that corrects an inaccuracy of the original or prior message (e.g., where the error code was incorrectly mapped to the symptom of the component or subsystem failure). Presentation of the message may be performed via a visual representation and/or audible representation, such as manifested on a user interface embodied as a display screen terminal, headset, portable device, speakers, etc. In one embodiment, the update may comprise a message that supplements or replaces the original or prior message. In one embodiment, the update may comprise executable code (e.g., script, etc.) that suppresses the original or prior message. For instance, the suppression of the message may be configured to occur after a predetermined quantity of occurrences of the message in a given period (e.g., after three (3) occurrences in an hour, suppress the message) or after a predetermined duration (e.g., if the message is a sustained presentation for an hour, suppress until the next day or after other elapsed durations). In one embodiment, the update may comprise a temporary work around. For instance, the work around may be embodied as a user-interactive message instructing the user (e.g., operator) on how to make adjustments in the machine 12 to circumvent the message and/or the underlying problem at least temporarily. As another example, the work around may include executable code (e.g., software patch) that, once loaded into the machine 12, automatically begins implementing the work around to circumvent the message and/or the underlying problem at least temporarily.

Figure 2A:
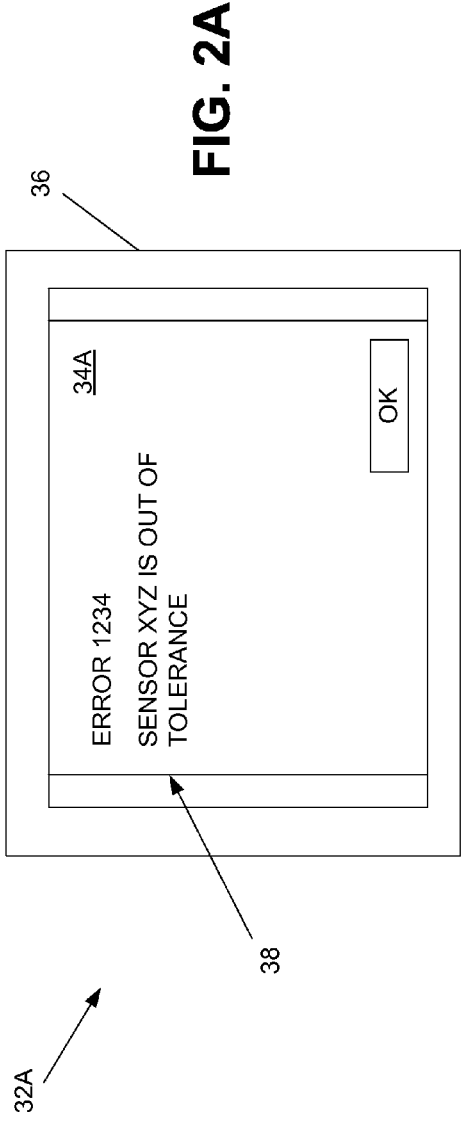
FIGS. 2A-2B are screen diagrams that illustrate example user interface screens used on a machine for conveying to an operator an error mitigation message in an embodiment of a machine diagnostic mitigation system.
Figure 2B:
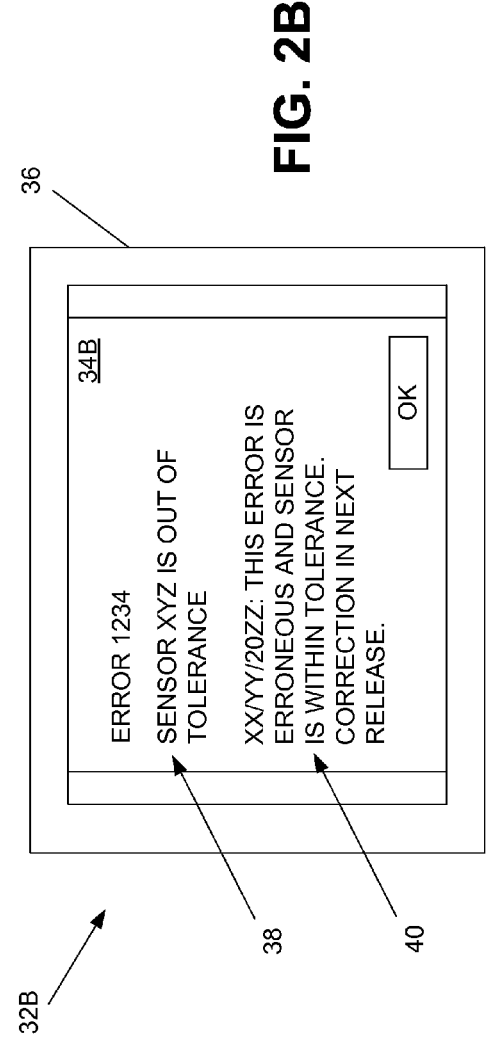

As one example operation, attention is directed to FIGS. 2A-2B, which comprise respective screen diagrams 32A, 32B that illustrate example user interface screens 34A, 34B presented on a display screen terminal 36 (or other user interface in some embodiments) residing on the machine 12 for conveying to a user (e.g., operator) an update (e.g., error mitigation message) in an embodiment of a machine diagnostic mitigation system 10. It should be appreciated that the format and/or substance of the user interface screens 34A, 34B are merely illustrative, and that in some embodiments, other formats, conveyed error codes, and/or mitigation messages may be used to achieve similar effect. Referring to FIG. 2A, assume an operator receives on the user interface screen 34A of the display screen terminal 36 an error message 38 that reads, "Error 1234: Sensor XYZ is out of tolerance." The sensor that is purportedly out of tolerance may comprise any one of the sensors 30 shown in FIG. 1. For purposes of illustration, assume the sensor 30 associated with computing device 24B is the sensor at issue for this example. Also, it is also assumed for purposes of this example that the system configuration for the application software operating on the computing device 24B comprises system version 2.56. After an investigation by service and engineering (e.g., days to weeks), it is determined that, in fact, the error message 38 is triggering too early, so it is a software fault associated with the computing device 24B and not a sensor fault. In other words, the error message is inaccurate. Operators of conventional systems may see this message 38 each time the system is booted, but due to the complexity of the system component involved, a fully validated fix cannot be provided for approximately four (4) months (as an illustrative, non-limiting example). In the meantime, customers using conventional systems normally would be contacting the manufacturer or dealer about this issue frequently. Also, dealers of new users, in a conventional system, may be filing warranty claims against parts of the system to try and demonstrate they are solving the customers' needs, yet usually to no avail. In an embodiment of a machine diagnostic mitigation system 10, personnel from the service organization of the manufacturer (or other personnel) loads an update embodied as an update configured as an alternate flow (e.g., mitigation message) for the system version 2.56 for error 1234 to the server device 18 (FIG. 1). In one embodiment, all connected systems (e.g., the control system 22 of machine 12 as well as network-capable control systems of other machines) that have this system version (e.g., 2.56) running in their respective computing device 24B connect to the server device 18 over a network (e.g., the wide area network 16 via the wireless network 14) and receive this message/workflow. Accordingly, and referring to the user interface screen 34B, a mitigation message 40 is presented on the display screen terminal 36 along with the original error message 38, the mitigation message 40 correcting the inaccuracy of the error message 38. For instance, the mitigation message may read, "XX/YY/20ZZ: This error is erroneous and sensor is within tolerance. Correction in next release." Also, the presentation of the mitigation message 40 provides the customer with the sense that the manufacturer is actively addressing the issue.

Figure 3A:
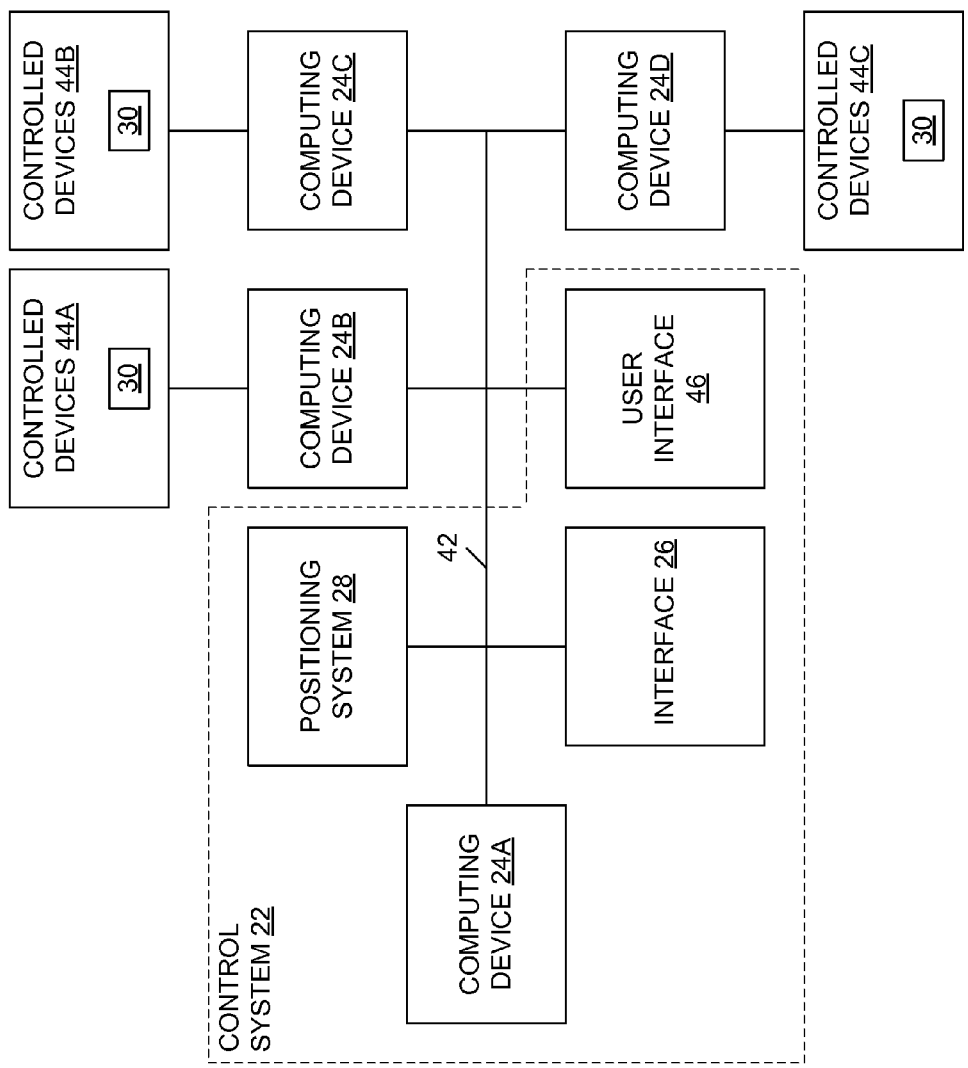
FIG. 3A is a block diagram that illustrates an embodiment of an example control system and coupled computing devices of an embodiment of a machine diagnostic mitigation system.

With continued reference to FIGS. 1-2B, attention is now directed to FIG. 3A, which illustrates an embodiment of the control system 22, which may be used in an embodiment of a machine diagnostic mitigation system 10. It should be appreciated within the context of the present disclosure that some embodiments may include additional components or fewer or different components, and that the example embodiment depicted in FIG. 3A is merely illustrative of one embodiment among others. The control system 22 comprises the computing device 24. The computing device 24 is coupled in a network 42 (e.g., a CAN network or other network, and not limited to a single network) to a positioning system 28 (e.g., GNSS receiver, which may include the ability to access one or more constellations jointly or separately), a plurality of other computing devices 24B-24D, which are each respectively coupled to controlled devices 44A-44D of the associated subsystem, a user interface 46, and the interface 26 described above. In some embodiments, functionality of the interface 26 may be embedded in (or directly coupled to) the computing device 24. The controlled devices 44A-C collectively comprise the various actuators and sensors 30 of the associated subsystem residing on the machine 12, including those used to control machine navigation (e.g., speed, direction (such as a steering system), etc.), implement (e.g., header or trailer) position, and/or control, internal processes, such as climate control, among other functions or processes. The user interface 46 may be a keyboard, mouse, microphone, touch-type (or other type of) display device (e.g., display screen terminal 36), joystick, steering wheel, or other devices (e.g., switches) that enable input by an operator and also enable monitoring of machine operations. The positioning system 28, as is known, may optionally include guidance functionality to enable autonomous or semi-autonomous operation of the machine 12 in cooperation with other controlled devices 44 and the computing device 24A (e.g., via positioning software residing in the computing device 24A). In some embodiments, guidance functionality is omitted. The interface 26 comprises hardware and software that respectively enables wireless (e.g., cellular/Internet) access via the networks 14, 16 (FIG. 1). The interface 26 may comprise MAC and PHY components (e.g., wireless modem circuitry, including transceivers, antennas, etc.), as should be appreciated by one having ordinary skill in the art. As indicated above, functionality of the interface 26 (or other components of the control system 22) may be integrated into the computing device 24A in some embodiments.

In one embodiment, the computing device 24A is configured to receive and process the information from the interface 26, the positioning system 28, the computing devices 24B-24D, and/or the user interface 46. For instance, the computing device 24A may receive user input via the display screen terminal 36, such as to request connection to the server device 18, or in some embodiments, the connection may be performed automatically with (or without) feedback to the operator presented on the terminal 36. In some embodiments, the computing device 24A may receive input from the positioning system 28, its own software, or the computing devices 24B-24D, such as sensor (or in some embodiments, via the respective sensors 30 directly without passing through the intermediate computing device 24B-24D) or application software fault data, which the computing device 24A uses to map the data with a problem (e.g., via a look-up table stored in memory). In some embodiments, the message may be determined (e.g., via its own LUT or by access to another LUT) by the respective computing device 24B-24D handling the associated subsystem error, that determined error passed to the computing device 24A. In other words, the subsystem problem is manifested to the operator as a message, which the computing device 24A (or in some embodiments, the associated computing device 24B-24D) generates to alert the operator of the same. The computing device 24A is also configured to cause the transmission of information, such as system configuration information when connecting to the server device 18. System configuration information may include a version of the problem application software and/or hardware at issue for the respective subsystem (e.g., involved with the message), a region in which the machine 12 operates (e.g., using the positioning system information), a date (e.g., current date), and/or machine type, among other helpful identifying information. Note that one or more of the components depicted in FIG. 3A may be combined into fewer components, or distributed among additional components in some embodiments.

Figure 3B:
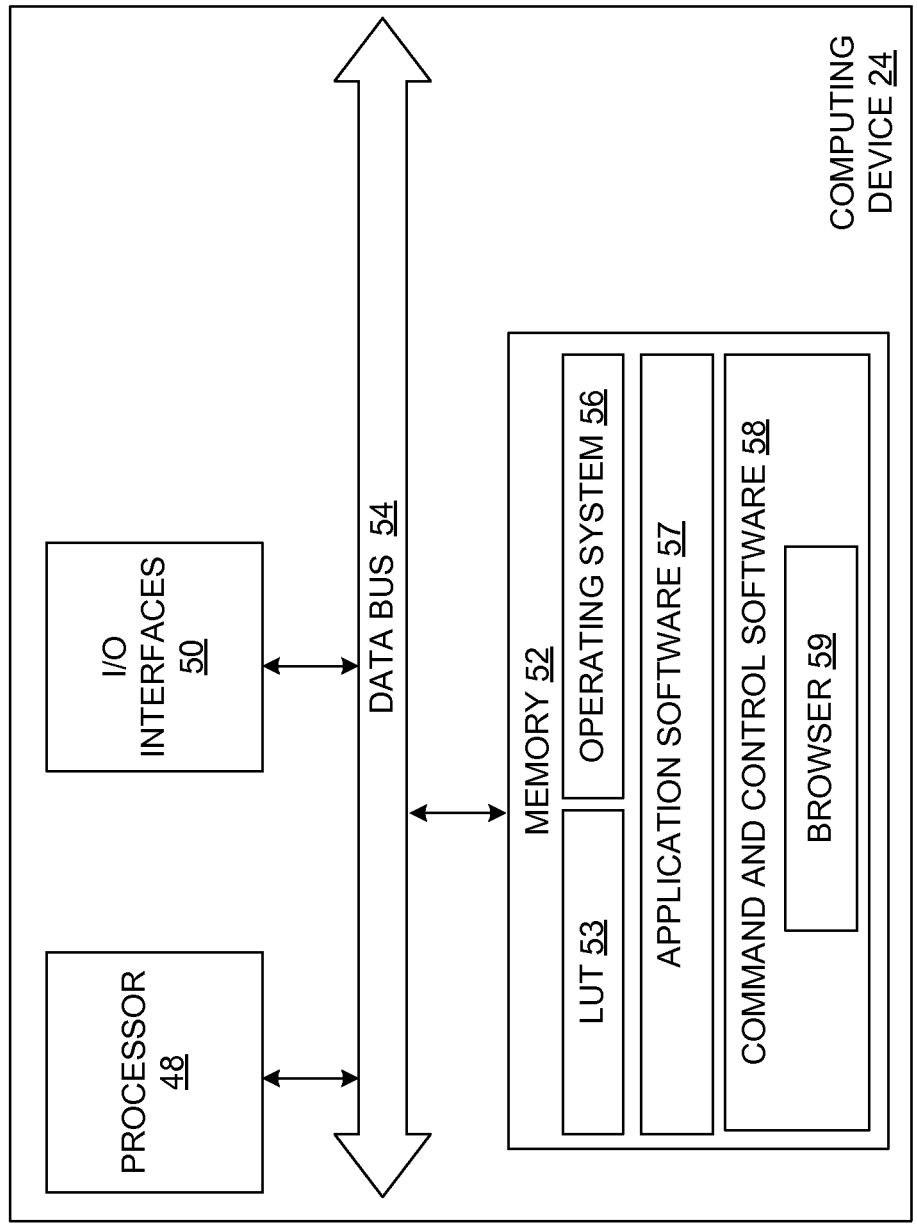
FIG. 3B is a block diagram that illustrates an embodiment of an example computing device implemented in association with the example control system of FIG. 3A.

With continued reference to FIG. 3A, FIG. 3B further illustrates an example embodiment of the computing device 24A. One having ordinary skill in the art should appreciate in the context of the present disclosure that the example computing device 24A is merely illustrative, and that some embodiments of computing devices may comprise fewer or additional components, and/or some of the functionality associated with the various components depicted in FIG. 3B may be combined, or further distributed among additional modules, in some embodiments. Further, in some embodiments, the computing devices 24B-24D may embody a similar architecture, and hence discussion of the same are omitted here for brevity. The computing device 24A is depicted in this example as a computer, but may be embodied as a programmable logic controller (PLC), FPGA, ASIC, among other devices. It should be appreciated that certain well-known components of computers are omitted here to avoid obfuscating relevant features of the computing device 24A. In one embodiment, the computing device 24A comprises one or more processors, such as processor 48, input/output (I/O) interface(s) 50, and memory 52, all coupled to one or more data busses, such as data bus 54. The memory 52 may include any one or a combination of volatile memory elements (e.g., random-access memory RAM, such as DRAM, and SRAM, etc.) and nonvolatile memory elements (e.g., ROM, hard drive, tape, CDROM, etc.). The memory 52 may store a native operating system, one or more native applications, emulation systems, or emulated applications for any of a variety of operating systems and/or emulated hardware platforms, emulated operating systems, etc. In some embodiments, the memory 52 may store a look-up table (LUT) 53 that maps the symptoms of component faults or failures to messages (e.g., including diagnostic codes). In some embodiments, the LUT may be stored remotely and accessed upon connection to a network. In the embodiment depicted in FIG. 3B, the memory 52 further comprises an operating system 56, application software 57, and command and control software 58, which in one embodiment, comprises browser software 59 (though in some embodiments, the browser software may be a separate software component). In one embodiment, the application software 57 comprises guidance software to be used in conjunction with the positioning system 28, though for other computing devices 24B-24D, the application software is relevant to the control of the associated subsystem. In some embodiments, the application software 57 comprises self-diagnostic executable code, enabling fault detection. The command and control software 58 processes inputs from the other computing devices 24B-24D, and passes any updates to the computing devices 24B-24D as needed. It should be appreciated that in some embodiments, additional or fewer software modules (e.g., combined functionality) may be employed in the memory 52 or additional memory, such as a BIOS for providing boot-up functionality. In some embodiments, a separate storage device may be coupled to the data bus 54, such as a persistent memory (e.g., optical, magnetic, and/or semiconductor memory and associated drives).

Figure 3C:
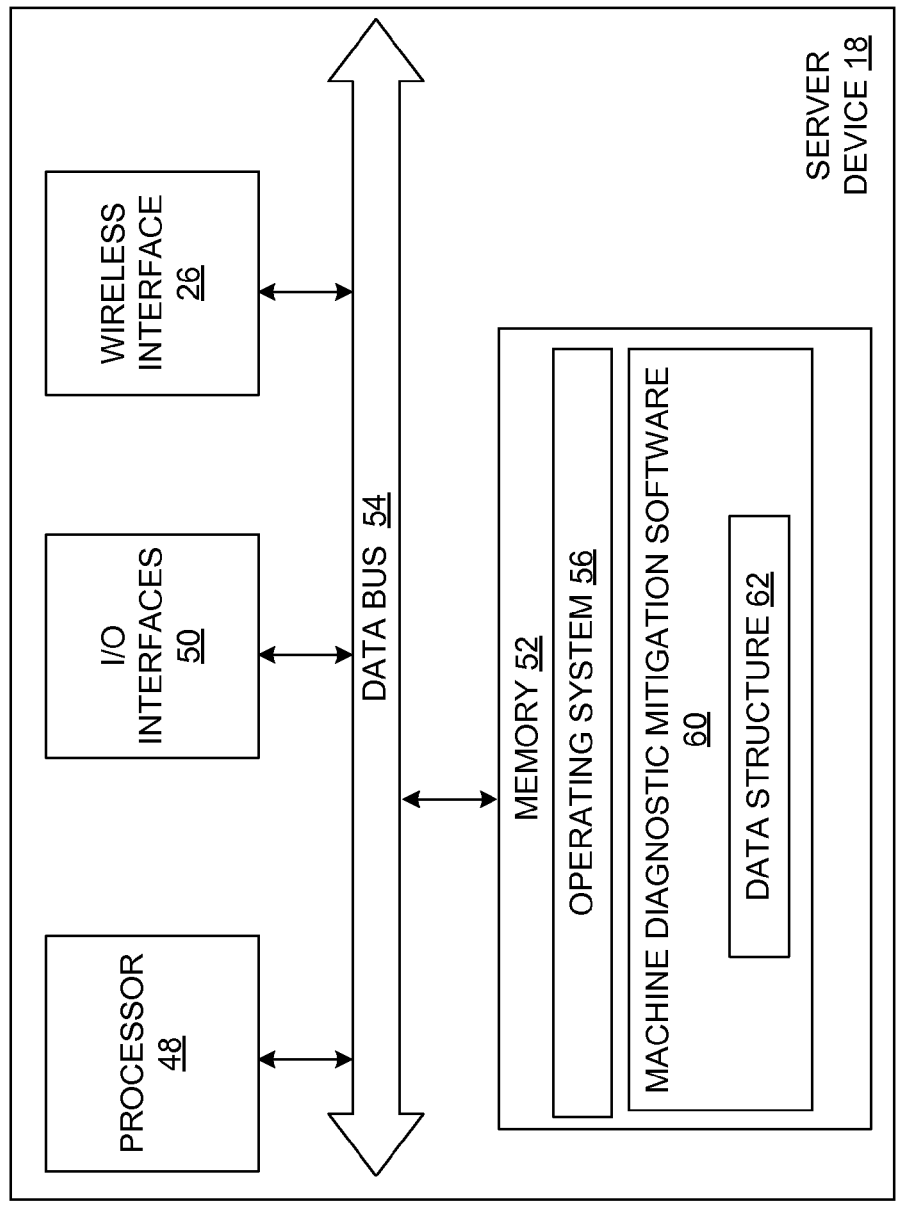
FIG. 3C is a block diagram that illustrates an embodiment of an example server device implemented in communication with the example control system of FIG. 3A

The command and control software 58 enables, via the browser software 59, connectivity to the server device 18 for receiving an update, and for presenting on the user interface 46 a message corresponding to the update and/or for implementing a work around. In some embodiments, the connectivity (via the interface 26) is automatic (e.g., responsive to fault detection, receipt or generation of a message, a message from the server device 18, or non-event-based (e.g., periodically or regularly), or in response to operator intervention via the user interface 46 (e.g., requesting connectivity). In one embodiment, the command and control software 58 comprises a user interface component for formatting any mitigation messages for presentation (e.g., verbally or audibly). In some embodiments, the command and control software 58 receives an update via an upload from a memory device manually inserted into a data port coupled to the computing device 24A (e.g., via the I/O interface 50). In one embodiment, the command and control software 58 accesses a data structure of the server device 18 to determine whether an update is available to mitigate an existing message (and underlying fault), the determination including a comparison of the system configuration of the update and the system configuration of the affected subsystem (e.g., software on the respective computing device 24A-24D, or a hardware component in some embodiments). In some embodiments, the comparison of system configurations is performed by the server device 18, as depicted in FIG. 3C. Digressing briefly, the server device 18 comprises machine diagnostic mitigation software 60 that comprises a data structure 62 (e.g., data base, liked list, etc.) of existing machines in operation and corresponding system configurations. In one embodiment, the server device 18 may receive an update from the manufacturer, such as through an interface 64 (e.g., a network interface, a data port, etc., with a similar architecture and functionality to the interface 26 of FIG. 3A), store the update in the data structure 62, and during a connection with the computing device 24A (via the interface 64), alert select machines of a given system configuration that an update is available for download or, in some embodiments, upon connection, send (e.g., push) the updates (without or without alert) to the computing devices that comprise the relevant system configuration. In some embodiments, user interactivity may be involved. For instance, the server device 18 may host a website, wherein the operator (or other user) may access an account and select a link to the update. These and/or other mechanisms for providing access by the machine 12 to the updates may be used, as should be appreciated by one having ordinary skill in the art in the context of the present disclosure.

Referring again to FIG. 3B, in one embodiment, the command and control software 58 receives the update, and funnels the update to the affected computing device 24, which executes the update to correct, supplement, and/or suppress the current message. In some embodiments where the diagnostics or computing is centralized, the updates may be executed at the central location (e.g., computing device 24A). Further, where the computing device 24A has a fault in its associated subsystem (e.g., the positioning system 28 for the control system 22, the update is executed by the processor 48 to correct, supplement, and/or suppress the current message. In addition, the updates funneled to the computing device 24 associated with the fault (or executed by the computing device 24A when the fault is associated with the control system 22, or in some embodiments, where mitigation is performed centrally) are executed by the associated processor to perform work arounds (e.g., with or without operator intervention) until a more permanent solution is provided by the manufacturer and/or dealer. In one embodiment, the work arounds may be in the format of executable code (e.g., a script). The command and control software 58 (or local software for the affected computing device 24B-24D) is also configured to delete the update when a more permanent solution is available.

Execution of the command and control software 58 and machine diagnostic mitigation software 60 may be implemented by the respective processor 48 (at the computing device 24A and server device 18) under the management and/or control of the respective operating system 56. The processor 48 may be embodied as a custom-made or commercially available processor, a central processing unit (CPU) or an auxiliary processor among several processors, a semiconductor based microprocessor (in the form of a microchip), a macroprocessor, one or more application specific integrated circuits (ASICs), a plurality of suitably configured digital logic gates, and/or other well-known electrical configurations comprising discrete elements both individually and in various combinations to coordinate the overall operation of the computing device 24 and/or associated subsystem controls.

The I/O interfaces 50 may comprise any number of interfaces for the input and output of signals (e.g., analog or digital data) for conveyance of information (e.g., data). The input may comprise input by an operator (local or remote) through the user interface 46 (e.g., a keyboard, joystick, steering wheel, touch-type screen, or mouse or other input device (or audible input in some embodiments)), and at least in the case of the computing device 24A, input from signals carrying information from one or more of the components connected to the network 42, such as the positioning system 28, controlled devices 44, other computing devices 24B-24D, and/or the interface 26, among other devices.

When certain embodiments of the computing device 24 (e.g., collectively, computing devices 24A-24D) and server device 18 are implemented at least in part as software (including firmware), as depicted for instance in FIGS. 3B and 3C, it should be noted that the software can be stored on a variety of non-transitory computer-readable medium for use by, or in connection with, a variety of computer-related systems or methods. In the context of this document, a computer-readable medium may comprise an electronic, magnetic, optical, or other physical device or apparatus that may contain or store a computer program (e.g., executable code or instructions) for use by or in connection with a computer-related system or method. The software may be embedded in a variety of computer-readable mediums for use by, or in connection with, an instruction execution system, apparatus, or device, such as a computer-based system, processor-containing system, or other system that can fetch the instructions from the instruction execution system, apparatus, or device and execute the instructions.

When certain embodiments of the computing device 24 and server device 18 are implemented at least in part as hardware, such functionality may be implemented with any or a combination of the following technologies, which are all well-known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 4:
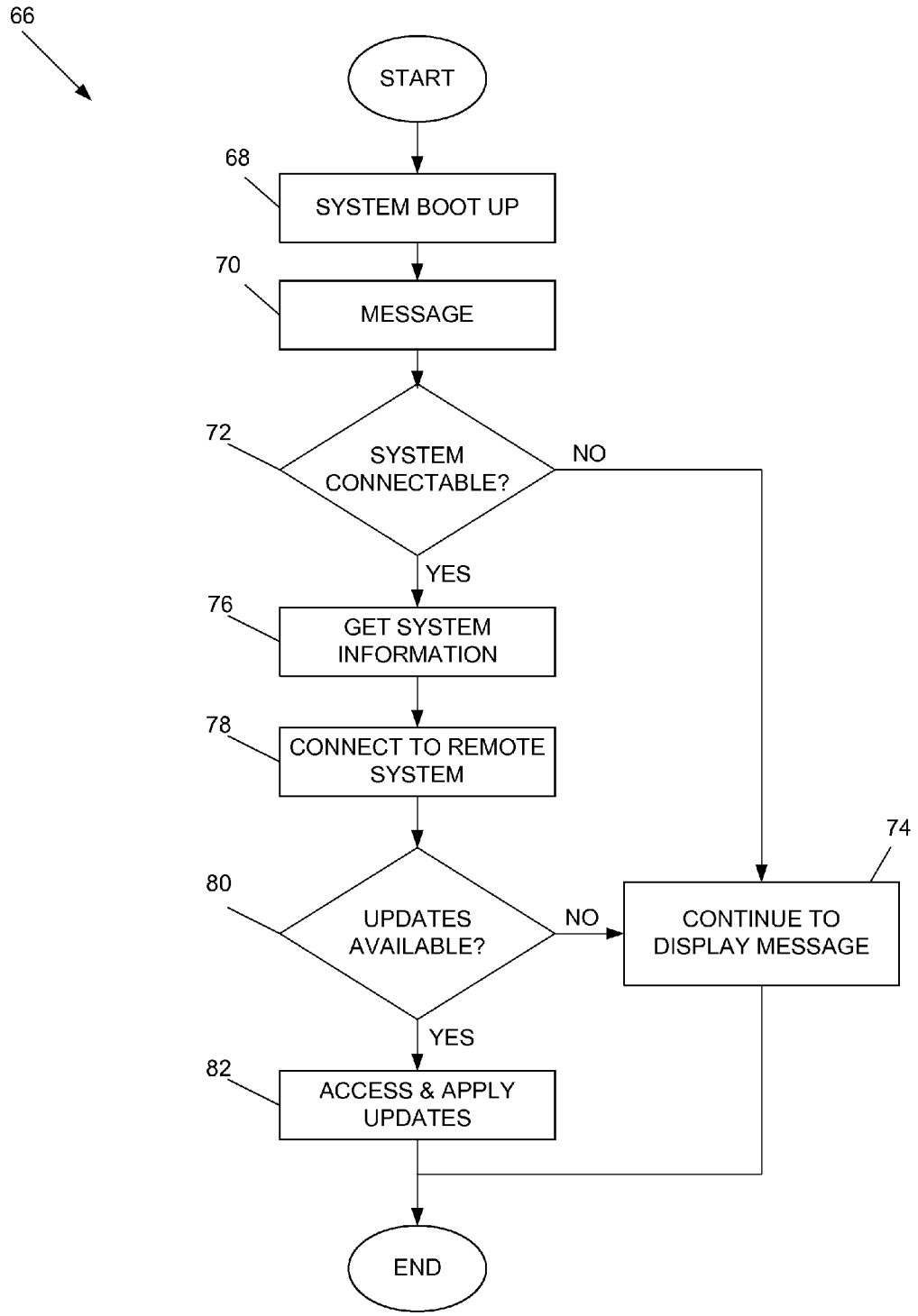
FIG. 4 is a flow diagram that illustrates an embodiment of an example method for checking for updates in an embodiment of a machine diagnostic mitigation system.

Reference is now made to FIG. 4, which is a flow diagram that illustrates an embodiment of an example method 66 for checking for updates in an embodiment of a machine diagnostic mitigation system 10. In one embodiment, the method 66 is implemented by a system comprising the computing device 24A (and the control system 22) and the computing device 24B-24D that is associated with the subsystem fault. In some embodiments, the method 66 may be performed by the computing device 24 associated with the fault (with or without cooperation of a central or master computing device 24A, the latter such as where the computing device (e.g., 24B-24D) comprises wireless connectivity functionality embedded therein or has access to the wireless interface 26 of the control system 22), and involves an embodiment where there is a periodic connection and a check for an update as part of the connection in the presence of an existing message. For instance, and digressing briefly, in the method 66 described below, a customer has a connected system (e.g., a machine with an internet connection via a telemetry device such as a modem) where a fault is generated on a sub-system of the machine which may range from annoying to debilitating. After the system provider (e.g., manufacturer) learns of a threshold number of instances (e.g., ruling out operator error) of such an issue through support calls and/or service visits, the service provider may commence work with engineering on a root cause analysis. After a period of time (e.g., few days), a work around may be determined and it is uploaded to a central location (e.g., the server device 18) and constrained with parameters of which systems it effects (e.g., the system configuration, such as a sub/system version number, system type, location of system, serial number range of system, date, etc.). In one embodiment, connected systems check this central location periodically and determine if there is an update for their system. As many of these changes may be updates embodying simple information updates, suppressions of erroneous errors, and/or simple logic work flows, their uploading to the server device 18 (and consequential loading to the affected machine 12) does not require the same rigor to release them (compared to a more permanent solution) and may be generally controlled by a manufacturer's service department.

Returning now to the method 66, at (68), there is a system boot-up (e.g., of the computing device 24, such as the computing device 24A and/or an affected computing device 24B-24D, collectively referred to herein as the computing device 24 or system where it is understood that any one of the computing devices 24 or more than one computing device 24 may be involved), and an message is displayed (70). The message includes any warnings, diagnostic messages, and/or textual or graphical (e.g., icons) messages, including diagnostic codes and error messages/codes. The method 66 determines whether the system is configured for network connectability (72). If not ("No"), the message continues to be displayed (74) and the process ends. If "yes" to the determination (72), the method 66 accesses the system configuration information (76) and connects to a remote system (e.g., the server device 18) (78). The method 66 determines whether updates are available (80). In one embodiment, the method 66 determines if there is an update stored at the server device 18 that corresponds to the accessed system configuration information. In some embodiments, the determination is made by the server device 18 and access is enabled to the update by the method 66. If no updates are available ("No"), then processing continues to (74). If updates are available ("Yes"), the processing continues to (82) where the update (e.g., corresponding to the system configuration) is accessed and applied to the current message.

An example of pseudo code that may accomplish the mitigation (e.g., where an erroneous error keeps appearing) may take the following form in some embodiments:

```
If (system version = x AND error number = y) then
  Alternate Text ("This error is not correct and will be corrected in the
next
version, please ignore");
  Suppress Error (rest of day)
End
```

As another example of pseudo code that may accomplish mitigation (e.g., where the machine of type z needs a calibration to fix a specific issue) may take the following form in some embodiments:

```
If (system version = x and error number = y and machine type = z) then
  Alternate Text ("To correct this issue, please select the button below to
calibrate sensor")
  Link to Calibration
End
```

As to the latter mitigation code, the operator may be presented on the user interface with the mitigation message and by selecting the button, the work around code is called into action to perform the mitigation.

Figure 5:
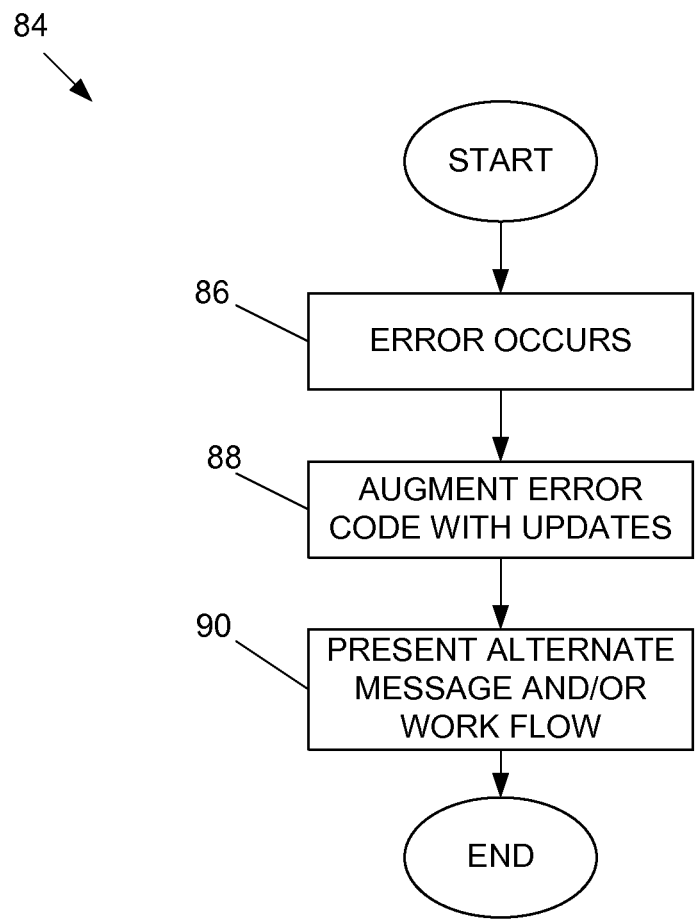
FIG. 5 is a flow diagram that illustrates an embodiment of an example method for presenting an update with an error message in an embodiment of a machine diagnostic mitigation system.

Referring now to FIG. 5, shown is a flow diagram that illustrates an embodiment of an example method 84 for presenting an update (e.g., mitigation message, such as an alternate or supplemental message) along with a message (e.g., error message) in an embodiment of a machine diagnostic mitigation system 10. In one embodiment, the method 84 is implemented by a system comprising one or more of the computing devices 24. In (86), an error occurs, and the method (84) augments an error message with an update (e.g., an alternate or supplemental error message and/or in some embodiments, a work around) (88). The method 84 presents (e.g., aurally and/or visually) the mitigation message or provides feedback to the operator of any work around that occurs via executable code (e.g., transparent to the operator). In some embodiments, the mitigation message may be presented along with the original (or prior) error message, or the mitigation message may replace the original (or prior) error message. Note that in some embodiments, there may be more than one mitigation message (i.e., visual or aural representation of the update) over time.

Figure 6:
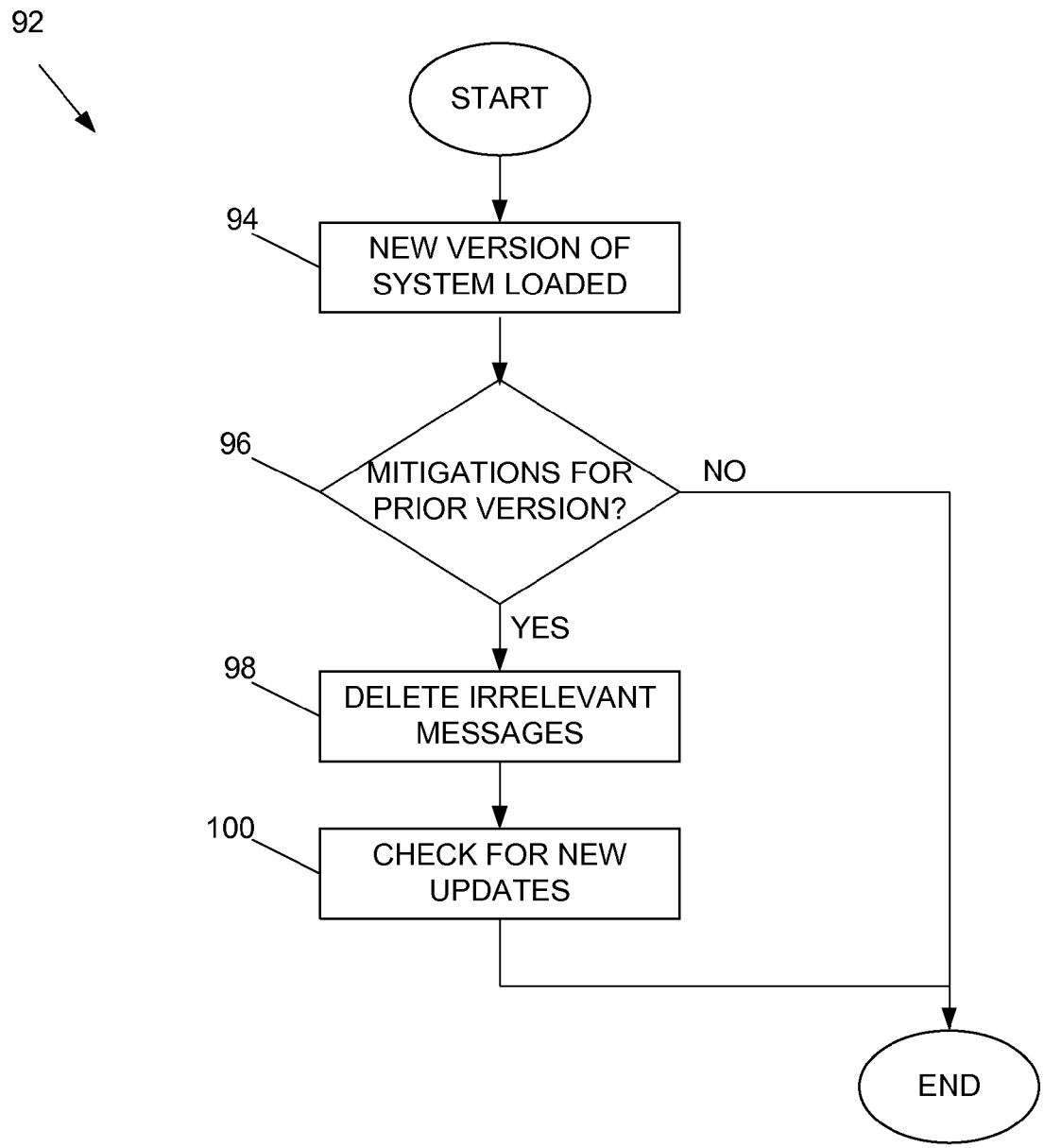
FIG. 6 is a flow diagram that illustrates an embodiment of an example method for handling an expiration of an update in an embodiment of a machine diagnostic mitigation system.

FIG. 6 is a flow diagram that illustrates an embodiment of an example method 92 for handling an expiration of an update in an embodiment of a machine diagnostic mitigation system 10. In one embodiment, the method 92 is implemented by a system comprising one or more computing devices 24 and the control system 22 (or like functionality embedded in, or accessed by, one of the computing devices 24). The method 92 comprises receiving (e.g., downloaded via a network or uploaded via manual insertion via a memory device) a new version of the system software for the affected (problem) computing device 24 (94). For instance, the new version provides a more permanent solution to the underlying problem that resulted in the presentation of the message than the solution the update provides. The method 92 determines whether there are any current mitigations (e.g., updates) for the prior version (96). If not ("No"), then the process ends. If so ("Yes"), then the method 92 deletes the update (or components thereof) that is no longer relevant in view of the new version (98). For instance, the method 92 may delete mitigation messages, and/or overwrite executable code corresponding to the update. The method 92 continues to check for updates (100). In some embodiments, the check for updates may be performed only while there is an existing message.

Figure 7:
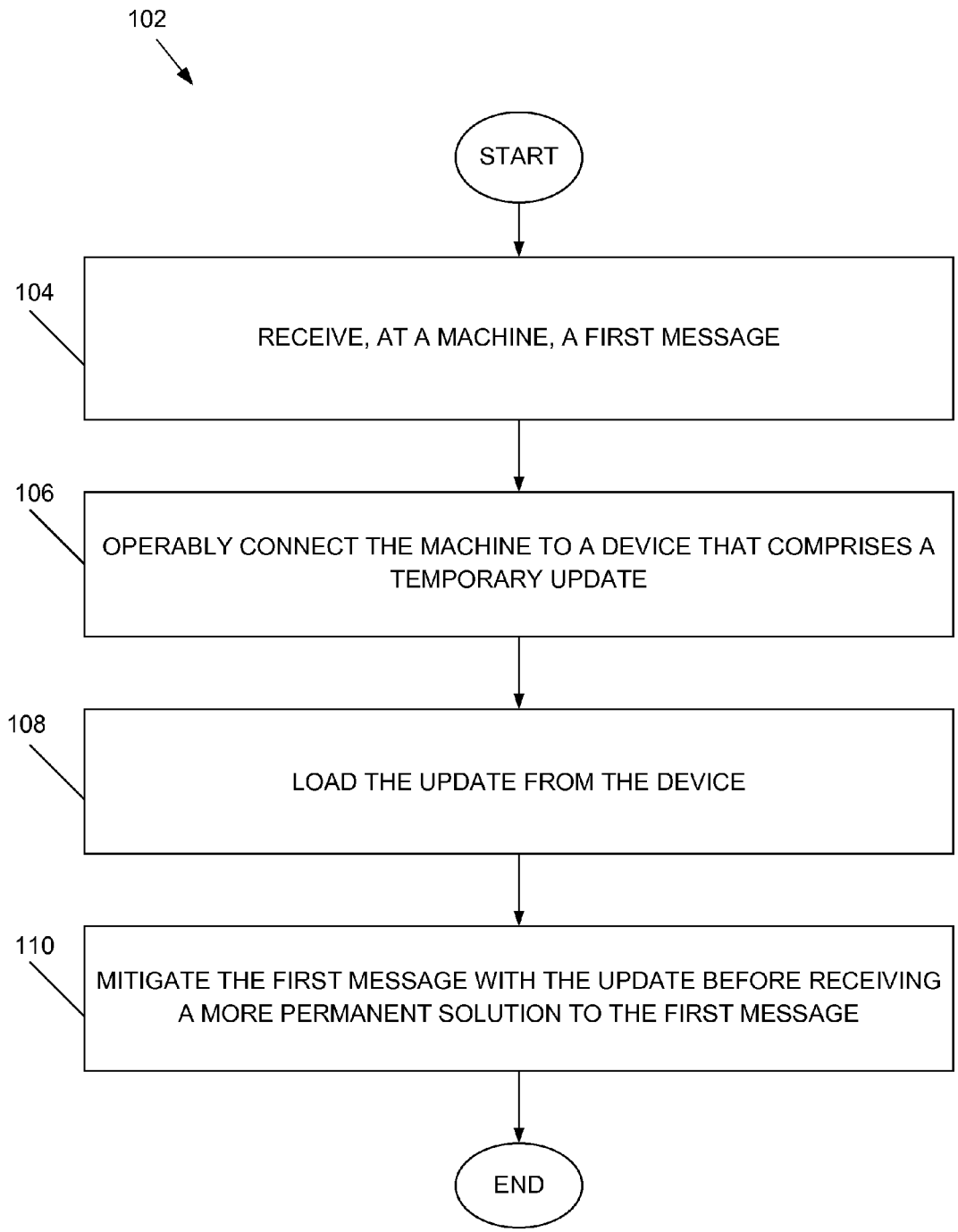
FIG. 7 is a flow diagram that illustrates an embodiment of an example machine diagnostic mitigation method.

In view of the above description, it should be appreciated that one embodiment of a machine diagnostic mitigation method 102, depicted in FIG. 7, comprises receiving, at a machine, a first message (104); operably connecting the machine to a device that comprises a temporary update (106); loading the update from the device (108); and mitigating the first message with the update before receiving a more permanent solution to the first message (110).

As is evident from the above description, certain embodiments of a machine diagnostic mitigation system 10 enable affected (i.e., affected by a problem in software and/or hardware that prompts a message), connected machines to now receive timely information on fixes to an issue, in some cases where an operator may not have realized a problem was present. Also, dealer technicians may receive an update to their devices and work with users of unconnected machines to ease some of their frustration, while a proper fix is developed. After a period of time, a more permanent, all-encompassing fix is developed and released such that dealers (or other personnel) may fully correct the machine issue. As the fix comes with a new system version, the existing work around (e.g., update) simply removes itself as it no longer applies.

Any process descriptions or blocks in flow diagrams should be understood as representing steps and/or modules, segments, or portions of code which include one or more executable instructions for implementing specific logical functions or steps in the process, and alternate implementations are included within the scope of the embodiments in which functions may be executed out of order from that shown or discussed, including substantially concurrently, depending on the functionality involved, as would be understood by those reasonably skilled in the art of the present disclosure.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and protected by the following claims.

At least the following is claimed:

1. A method, comprising:
   receiving, at a machine, a first message;
   operably connecting the machine to a device that comprises a temporary update;
   loading the update from the device;
   mitigating the first message with the update before receiving a more permanent solution to the first message; and
   further mitigating the first message by presenting a second message.

2. The method of claim 1, wherein the second message corrects an inaccuracy of the first message.

3. The method of claim 1, wherein the second message supplements or replaces the first message.

4. A method, comprising:
   receiving, at a machine, a first message;
   operably connecting the machine to a device that comprises a temporary update;
   loading the update from the device;

mitigating the first message with the update before receiving a more permanent solution to the first message; and
further mitigating the first message by suppressing the first message.

5. A machine, comprising:
a first interface device configured to present a first message to an operator of the machine;
a second interface device configured to operably connect the machine to a device; and
a processor configured to:
  receive a temporary update from the device via the second interface device;
  mitigate the first message with the update before receiving a more permanent solution to the first message; and
  further mitigate the first message by presenting a second message.

6. The machine of claim 5, wherein the second message corrects an inaccuracy of the first message.

7. The machine of claim 5, wherein the second message supplements or replaces the first message.

8. A machine, comprising:
a first interface device configured to present a first message to an operator of the machine;
a second interface device configured to operably connect the machine to a device; and
a processor configured to:
  receive a temporary update from the device via the second interface device;
  mitigate the first message with the update before receiving a more permanent solution to the first message; and
  further mitigate the first message by suppressing the first message.

9. A machine, comprising:
a first interface device configured to present a first message to an operator of the machine;
a second interface device configured to operably connect the machine to a device; and
a processor configured to:
  receive a temporary update from the device via the second interface device;
  mitigate the first message with the update before receiving a more permanent solution to the first message, wherein the second interface device comprises a modem that operably connects to the device via a network, and the first interface device comprises one of a device for providing a visual representation of the update, a device for providing an audible representation of the update, or a device for providing a combination of a visual and audible representation of the update.

* * * * *